US012442521B2

(12) United States Patent
Wang

(10) Patent No.: US 12,442,521 B2
(45) Date of Patent: Oct. 14, 2025

(54) ROTATABLY ADJUSTABLE LAMP FIXING MEMBER

(71) Applicant: Guangdong Guanyi Lighting Co., LTD, Shaoguan (CN)

(72) Inventor: Shifang Wang, Dongguan (CN)

(73) Assignee: Guangdong Guanyi Lighting Co., LTD, Shaoguan (CN)

( * ) Notice: Subject to any disclaimer, the term of this patent is extended or adjusted under 35 U.S.C. 154(b) by 0 days.

(21) Appl. No.: 18/790,409

(22) Filed: Jul. 31, 2024

(65) Prior Publication Data

US 2024/0384864 A1 Nov. 21, 2024

(51) Int. Cl.

*F21V 21/26* (2006.01)
*F21S 4/10* (2016.01)
*F21V 19/00* (2006.01)
*F21V 21/08* (2006.01)
*F21V 21/30* (2006.01)

(52) U.S. Cl.

CPC ................ *F21V 21/26* (2013.01); *F21S 4/10* (2016.01); *F21V 19/006* (2013.01); *F21V 21/0824* (2013.01); *F21V 21/30* (2013.01)

(58) Field of Classification Search

CPC ...... F21V 21/0824; F21V 21/26; F21V 21/30; F21V 21/14; F21S 4/10; F21S 4/20
See application file for complete search history.

(56) References Cited

U.S. PATENT DOCUMENTS

| | | | | |
|---|---|---|---|---|
| 10,145,520 | B1 * | 12/2018 | Tang | F21V 21/0824 |
| 10,156,777 | B1 * | 12/2018 | Altamura | F21S 4/10 |
| 11,788,695 | B1 * | 10/2023 | Hwang | F21S 9/037 362/157 |
| 11,859,801 | B1 * | 1/2024 | Hwang | F21V 21/30 |
| 2008/0055916 | A1 | 3/2008 | Chen et al. | |
| 2013/0279189 | A1 | 10/2013 | Suzuki et al. | |
| 2018/0112855 | A1 * | 4/2018 | Adams, IV | F21V 17/164 |
| 2018/0187867 | A1 * | 7/2018 | Adams, IV | F21V 17/16 |
| 2023/0085297 | A1 | 3/2023 | Liu et al. | |

* cited by examiner

*Primary Examiner* — William N Harris
(74) *Attorney, Agent, or Firm* — Hemisphere Law, PLLC; Zhigang Ma

(57) ABSTRACT

The present disclosure relates to the technical field of lamp fixing members, and discloses a rotatably adjustable lamp fixing member, including a plugging device and a fixing device. The fixing device is rotatably connected to the plugging device to adjust a position of a lamp; the fixing device includes a first elastic arm and a second elastic arm which are symmetrically arranged; the first elastic arm and the second elastic arm cooperate with each other to form a first clamping position configured to clamp the lamp; the plugging device includes a mounting pin; the mounting pin extends outwards to be provided with a plurality of side plates; and front ends of the side plates are inclined to form insertion tips.

9 Claims, 8 Drawing Sheets

ROTATABLY ADJUSTABLE LAMP FIXING MEMBER

TECHNICAL FIELD

The present disclosure relates to the technical field of lamp fixing members, and in particular, to a rotatably adjustable lamp fixing member.

BACKGROUND

A colored lamp, also referred to as a colored lamp bulb, is a decorative lamp that is often used in outdoor recreation parties or for decorating yards. Colored lamps can emit light with different colors and can present a flickering effect by adjusting a current frequency. In recent years, the colored lamps are loved by customers due to their effects of setting off the party atmosphere or adding the artistic effect.

The existing colored lamps purchased on the market do not have fixing members. When the colored lamps need to be mounted in a passage of a garden, on a lawn, and in other places, the colored lamps often need to be used in conjunction with a fixing member, so as to quickly fix the colored lamps. However, if the existing lamp fixing member is used, the position of the lamp cannot be adjusted as needed. After being connected to the fixing member, the lamp can only be fixed at one place or can only spin in situ, which cannot meet the needs of customers for diversification of decoration. In view of this, the inventor has made a new invention.

SUMMARY

To overcome the shortcomings in the prior art, the present disclosure aims to provide a rotatably adjustable lamp fixing member, which has the characteristics of adjustment of a lamp angle and good decoration effect.

To achieve the above objectives, the present disclosure provides a rotatably adjustable lamp fixing member, including a plugging device and a fixing device, wherein the fixing device is rotatably connected to the plugging device to adjust a position of a lamp; the fixing device includes a first elastic arm and a second elastic arm which are symmetrically arranged; the first elastic arm and the second elastic arm cooperate with each other to form a first clamping position configured to clamp the lamp; the plugging device includes a mounting pin; the mounting pin extends outwards to be provided with a plurality of side plates; and front ends of the side plates are inclined to form insertion tips.

Further, the fixing device includes a connecting portion; connecting convex shafts are arranged on two sides of the connecting portion; a top of the plugging device extends to be provided with connecting holes adapted to the connecting convex shafts; the connecting convex shafts are mounted in the connecting holes and are able to rotate around the connecting hole to adjust the angle; and one end of the first elastic arm and one end of the second elastic arm are both fixedly connected to the connecting portion.

Preferably, an clastic gap convenient for mounting or removal of the fixing device is further provided in the middle of the connecting portion.

Preferably, the connecting holes are provided with mounting guide slots.

Preferably, a plurality of positioning slots are further provided on two sides of the connecting portion; the plurality of positioning slots are arranged in an arc shape; and the plugging device is provided with positioning convex blocks that are adapted to the positioning slots.

Further, connecting slots are arranged between the plurality of positioning slots, and the connecting slots communicate two adjacent positioning slots.

Still further, a third elastic arm and a fourth elastic arm are symmetrically arranged between the first elastic arm and the second elastic arm; the third elastic arm and the fourth elastic arm cooperate with each other to form a second clamping position; and the second clamping position is smaller than the first clamping position.

Preferably, the plugging device is further provided with an assembling portion, and the assembling portion is arranged at a top of the mounting pin.

Further, the assembling portion is provided with at least one gap.

Further, the plugging device and the fixing device are both integrally injection-molded.

Beneficial effects: Compared with the prior art, the present disclosure discloses a rotatably adjustable lamp fixing member, including a plugging device and a fixing device. The fixing device is rotatably connected to the plugging device to adjust a position of a lamp; the fixing device includes a first clastic arm and a second elastic arm which are symmetrically arranged; and the first elastic arm and the second elastic arm cooperate with each other to form a first clamping position configured to clamp the lamp. The present disclosure has the following advantages: 1. The fixing device is rotatably connected to the plugging device, and the lamp can rotate with the fixing device after being fixed to adjust an angle and meet a need for diversified decoration. 2. The fixing device is provided with a plurality of clamping positions to clamp a plurality of lamps of different model numbers, and the application range is wide. 3. The plugging device is provided with an assembling portion to assist in plugging the fixing member. 4. The fixing member has a simple overall structure and is convenient to use.

Figure 1:
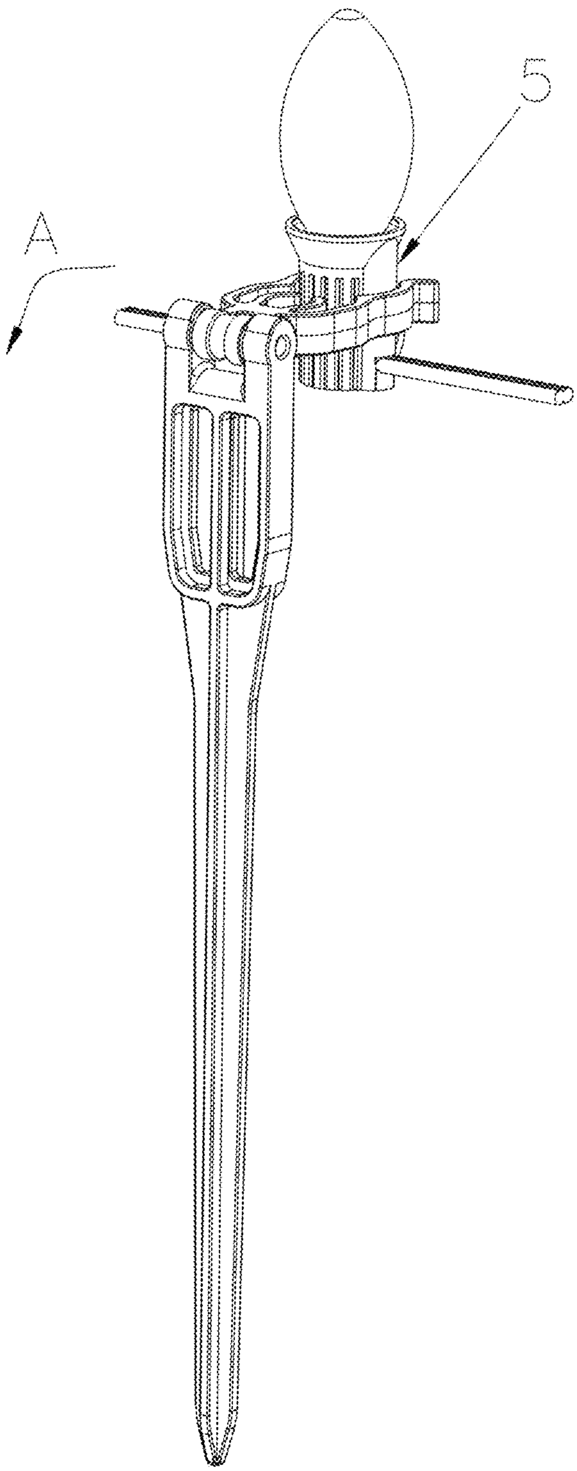
FIG. 1 is a schematic structural diagram of rotation by 90 degrees according to the present disclosure.

Reference numerals include:

2: fixing device; 21: first elastic arm; 22: second elastic arm; 23: first clamping position; 24: connecting portion; 241: connecting convex shaft; 242: elastic gap; 243: positioning slot; 244: connecting slot; 25: third elastic arm; 26: fourth elastic arm; 27: second clamping position; 3: plugging device; 31: mounting pin; 311: side plate; 32: insertion tip; 33: connecting hole; 331: mounting guide slot; 34: positioning convex block; 35: assembling portion; 351: gap; 4: reinforcing plate; and 5: lamp.

DETAILED DESCRIPTION OF THE EMBODIMENTS

The present disclosure will be explained below in conjunction with the accompanying drawings 1 to 8.

Figure 3:
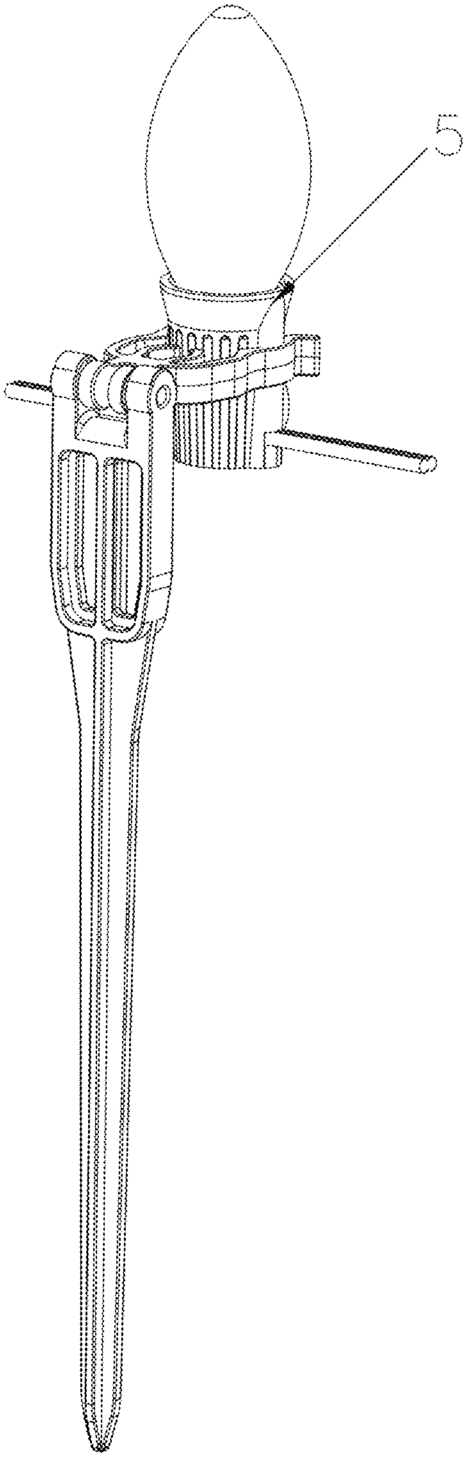
FIG. 3 is a schematic diagram of another embodiment of the present disclosure.

The present disclosure discloses a rotatably adjustable lamp fixing member, including a plugging device 3 and a fixing device. The fixing device 2 is rotatably connected to the plugging device 3 to adjust a position of a lamp 5; the fixing device 2 includes a first elastic arm 21 and a second elastic arm 22 which are symmetrically arranged; and the first elastic arm 21 and the second elastic arm 22 cooperate with each other to form a first clamping position 23 configured to clamp the lamp 5. A front end of the first elastic arm 21 and a front end of the second elastic arm 22 are horn-shaped to guide the lamp 5 to be clamped into the first clamping position 23. Due to the elasticity of the first elastic arm 21 and the second elastic arm 22, the first clamping position 23 can be used to simultaneously clamp small and large-sized lamps 5, as shown in FIGS. 1 and 3. The plugging device 3 includes a mounting pin 31. The mounting pin 31 extends outwards to be provided with a plurality of side plates 311; and front ends of the side plates 311 are inclined to form insertion tips 32. The mounting pin 31 is quickly inserted into soil by virtue of the insertion tips 32 to fix the lamp 5 on the ground. The side plates 311 that are symmetrically arranged on the mounting pin 31 are configured to further improve the stability of insertion of the fixing member.

Figure 2:
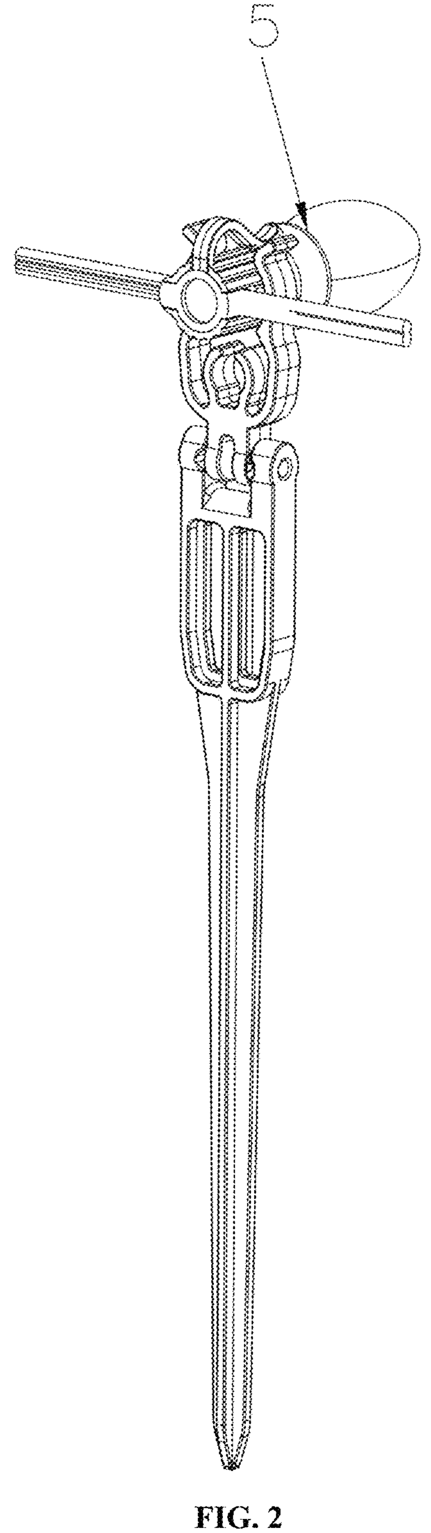
FIG. 2 is a schematic structural diagram of rotation by 180 degrees according to the present disclosure.

In the present disclosure, the fixing device 2 and the plugging device 3 are rotatably connected. During use, a decoration angle of the decorative lamp 5 can be adjusted according to a need of a decorator. As shown in FIG. 1, the lamp is rotated in direction A to achieve different angles. The most commonly used decoration angles are 90 degrees and 180 degrees, as shown in FIG. 1 and FIG. 2, which meet the needs of customers for diversified decoration. Furthermore, the fixing member has a simple overall structure, is convenient to use, has low manufacturing cost, and is more in line with the production requirement.

In this technical solution, the fixing device 2 further includes a connecting portion 24. The fixing device 2 is rotatably connected to the plugging device 3 through the connecting portion 24. As an embodiment, connecting convex shafts 241 are arranged on two sides of the connecting portion 24; a top of the plugging device 3 extends to be provided with a pair of connecting holes 33 adapted to the connecting convex shafts 241; and the connecting convex shafts 241 are assembled in the connecting holes 33 and can rotate around the connecting holes 33 to adjust the angle, so that the rotatable connection between the two devices is achieved. In this connection mode, the overall structure is simple, and the assembling difficulty is low. In this technical solution, one end of the first elastic arm 21 and one end of the second elastic arm 22 are both fixedly connected to the connecting portion 24, and openings are provided at the other ends for placing the lamp 5 into the first clamping position 23.

As a preference, an elastic gap 242 convenient for mounting or removal of the fixing device 2 is further provided in the middle of the connecting portion 24. When the connecting portion 24 needs to be mount, two sides of the connecting portion 24 are pushed, so that the two sides of the connecting portion 24 contract towards the elastic gap 242 in the middle, thereby reducing the volume of the connecting portion 24. This allows the connecting convex shafts 241 to be quickly inserted into the connecting holes 33. After the connecting portion is released, the two sides of the connecting portion 24 are reset, and the assembling of the fixing device 2 is completed. On the contrary, when the connecting portion 24 needs to be removed, the two sides of the connecting portion 24 are pushed to contract towards the elastic gap 242 in the middle, and the connecting convex shafts 241 are separated from the connecting holes 33.

Figure 6:
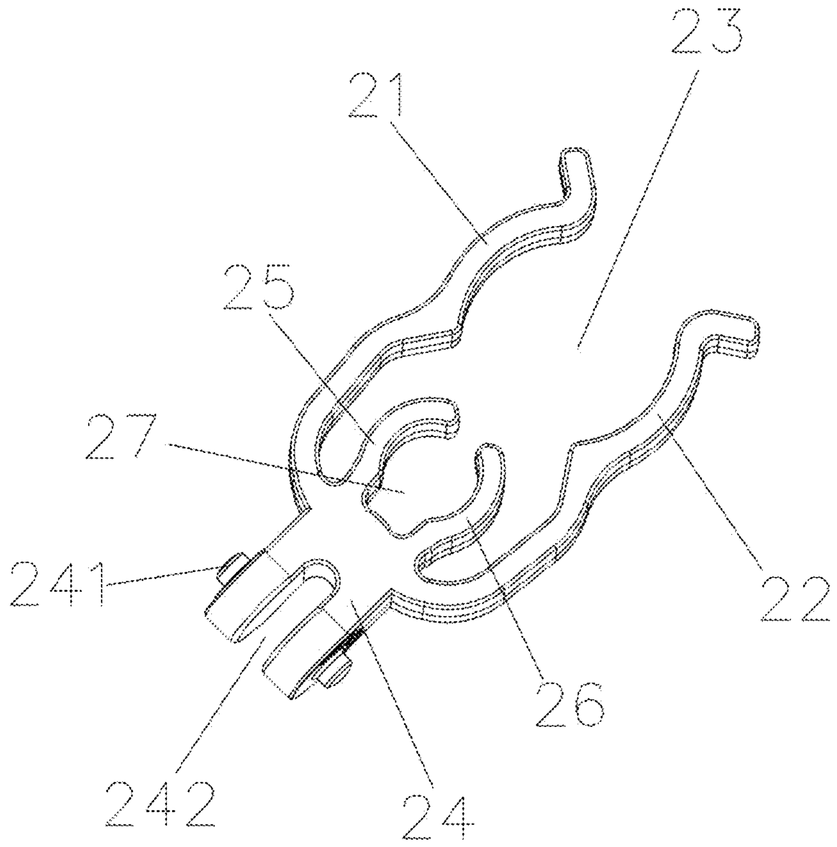
FIG. 6 is a schematic structural diagram of a fixing device of the present disclosure.

To further improve the technical solution, as shown in FIG. 6, based on the above-mentioned technical solution of providing the elastic gap 242, the connecting holes 33 are further provided with mounting guide slots 331. To assemble the fixing device 2, the two sides of the connecting portion 24 are pushed, and the connecting convex shafts 241 are pushed forwards in a direction of the mounting guide slots 331, so that the connecting convex shafts 241 can be quickly pushed into the connecting holes 33. On the contrary, to disassemble the fixing device 2, after the connecting portion 24 is pushed, the connecting convex shafts 241 are removed from the connecting holes 33 along the mounting guide slots 331. The mounting guide slots 331 of this technical solution have a guide effect, which not only saves the labor, but also improves the assembling efficiency.

Figure 7:
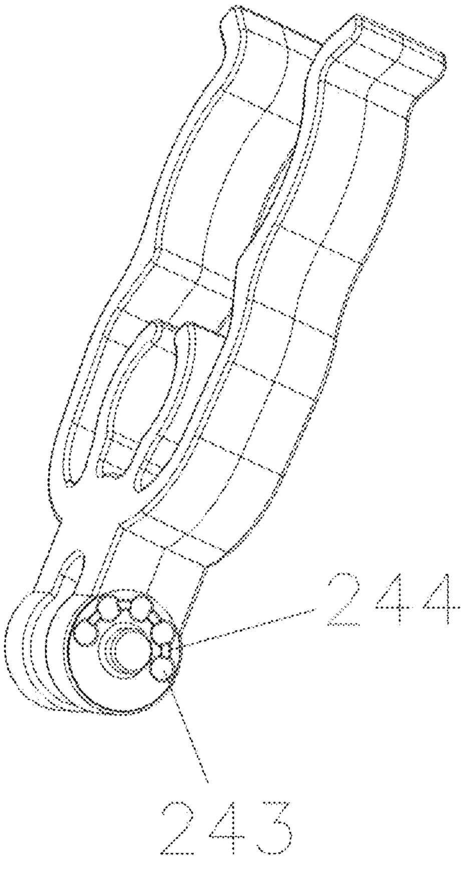
FIG. 7 is a schematic structural diagram of a positioning slot according to the present disclosure.
Figure 8:
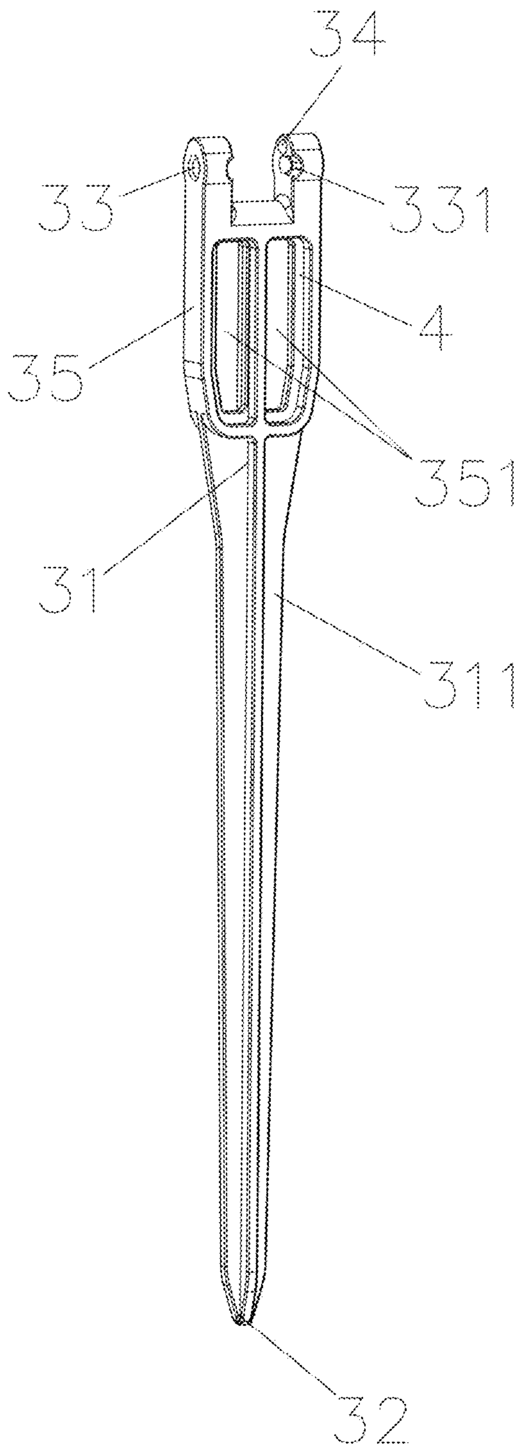
FIG. 8 is a schematic structural diagram of a plugging device according to the present disclosure.

As a preference, to prevent the fixing device 2 from moving back to its original position due to the gravity after being adjusted to a corresponding angle and failing to achieve a decoration effect, the inventor also sets a plurality of positioning slots 243 on the two sides of the connecting portion 24. The plurality of positioning slots 243 are arranged in an arc shape, as shown in FIG. 7. The plugging device 3 is provided with a positioning convex block 34 that is adapted to the positioning slots 243. After the fixing device 2 is adjusted to the corresponding angle, the positioning convex block 34 is clamped into one of the positioning slots 243 to further fix the position of the fixing device 2.

As another embodiment, connecting slots 244 are arranged between the plurality of positioning slots 243, and the connecting slots 244 communicate two adjacent positioning slots 243. The connecting slot 244 is provided between two positioning slots 243, so that the positioning convex block 34 has less resistance during motion between the adjacent positioning slots 243, and it is more labor-saving during the adjustment of the fixing device 2.

Figure 4:
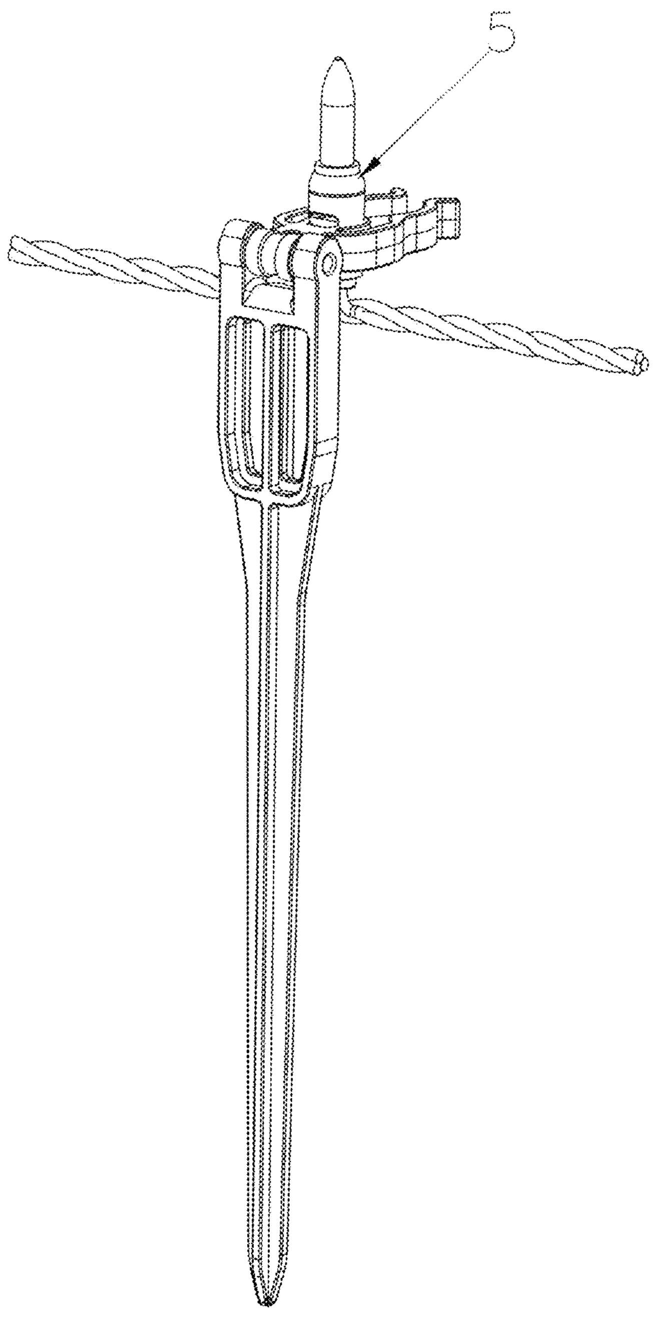
FIG. 4 is a schematic diagram of an embodiment of a second clamping position according to the present disclosure.
Figure 5:
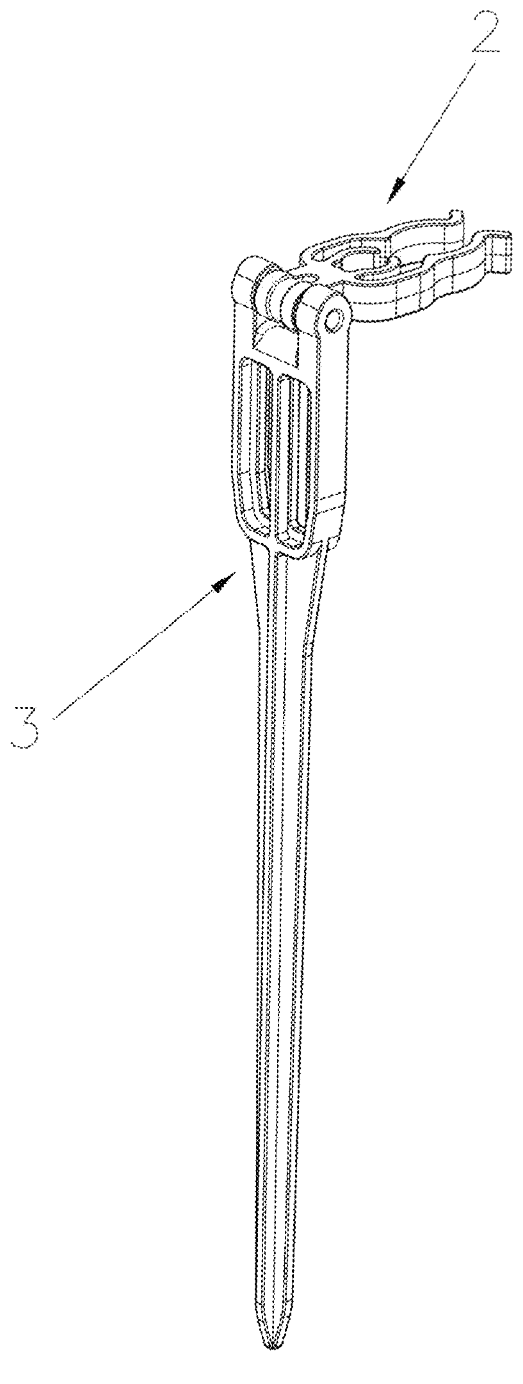
FIG. 5 is a schematic diagram of a three-dimensional structure of the present disclosure.

To further enlarge the application range of the fixing member, a third elastic arm 25 and a fourth elastic arm 26 are symmetrically arranged between the first elastic arm 21 and the second elastic arm 22; the third elastic arm 25 and the fourth elastic arm 26 cooperate with each other to form a second clamping position 27; and the second clamping position 27 is smaller than the first clamping position 23. The second clamping position 27 is embedded into the first clamping position 23. The second clamping position 27 can be used to clamp miniature lamp 5, as shown in FIG. 2 and FIG. 4. In the present disclosure, the first clamping position 23 and the second clamping position 27 do not affect each other during use, so the fixing member can simultaneously clamp two lamps 5.

As a preference, the plugging device 3 is further provided with an assembling portion 35, and the assembling portion 35 is arranged at a top of the mounting pin 31. When the fixing member is plugged into the soil, a user can hold the assembling portion 35 with the palm and use the assembling portion 35 as a load-bearing component to plug the mounting pin 31 downwards into the soil. The assembling portion 35 facilitates the user to grasp the fixing member and assists in mounting the fixing member.

Based on the above technical solution, the inventor also sets at least one gap 351 in the assembling portion 35. The main purpose of setting the gap is to save raw materials and minimize the production cost of assembling portion 35. However, to make the assembling portion 35 have sufficient structural strength, the inventor sets a circle of reinforcing plate 4 around the gap 351.

In this technical solution, the plugging device 3 and the fixing device 2 are directly injection-molded at one time through a designed mold separately. After the injection molding, the plugging device and the fixing device can be manually or automatically assembled to obtain a finished product. The overall process is simple. The fixing member is easy to manufacture; and the production cost is effectively reduced.

The above content only describes preferred embodiments of the present disclosure. A person of ordinary skill in the art can make changes to specific implementations and the application scope according to the idea of the present disclosure. The content of this specification should not be understood as a limitation on the present disclosure.

What is claimed is:

1. A rotatably adjustable lamp fixing member, comprising a plugging device (3) and a fixing device (2), wherein the fixing device (2) is rotatably connected to the plugging device (3) to adjust a position of a lamp (5); the fixing device (2) comprises a first elastic arm (21) and a second elastic arm (22) which are symmetrically arranged; the first elastic arm (21) and the second elastic arm (22) cooperate with each other to form a first clamping position (23) configured to clamp the lamp (5); the plugging device (3) comprises a mounting pin (31); the mounting pin (31) extends outwards to be provided with a plurality of side plates (311); and front ends of the side plates (311) are inclined to form insertion tips (32);

wherein the fixing device (2) further comprises a connecting portion (24); connecting convex shafts (241) are arranged on two sides of the connecting portion (24); a top of the plugging device (3) extends to be provided with connecting holes (33) adapted to the connecting convex shafts (241); the connecting convex shafts (241) are mounted in the connecting holes (33) and are able to rotate around the connecting holes (33) to adjust an angle between the fixing device and the plugging device; and one end of the first elastic arm (21) and one end of the second elastic arm (22) are both fixedly connected to the connecting portion (24).

2. The rotatably adjustable lamp fixing member according to claim 1, wherein an elastic gap (242) for mounting or removal of the fixing device (2) is further provided in a middle of the connecting portion (24).

3. The rotatably adjustable lamp fixing member according to claim 1, wherein the connecting holes (33) are provided with mounting guide slots (331).

4. The rotatably adjustable lamp fixing member according to claim 1, wherein a plurality of positioning slots (243) are further provided on two sides of the connecting portion (24); the plurality of positioning slots (243) are arranged in an arc shape; and the plugging device (3) is provided with a positioning convex block (34) that is adapted to the positioning slots (243).

5. The rotatably adjustable lamp fixing member according to claim 4, wherein connecting slots (244) are arranged between the plurality of positioning slots (243), and the connecting slots (244) communicate two adjacent positioning slots (243).

6. The rotatably adjustable lamp fixing member according to claim 1, wherein a third elastic arm (25) and a fourth elastic arm (26) are symmetrically arranged between the first elastic arm (21) and the second elastic arm (22); the third elastic arm (25) and the fourth elastic arm (26) cooperate with each other to form a second clamping position (27); and the second clamping position (27) is smaller than the first clamping position (23).

7. The rotatably adjustable lamp fixing member according to claim 1, wherein the plugging device (3) is further provided with an assembling portion (35), and the assembling portion (35) is arranged at a top of the mounting pin (31).

8. The rotatably adjustable lamp fixing member according to claim 7, wherein the assembling portion (35) is provided with at least one gap (351).

9. The rotatably adjustable lamp fixing member according to claim 1, wherein the plugging device (3) and the fixing device (2) are both integrally injection-molded.

* * * * *